United States Patent [19]

Rodgers

[11] Patent Number: 4,800,717
[45] Date of Patent: Jan. 31, 1989

[54] TURBINE ROTOR COOLING
[75] Inventor: Colin Rodgers, San Diego, Calif.
[73] Assignee: Sundstrand Corporation, Rockford, Ill.
[21] Appl. No.: 944,761
[22] Filed: Dec. 22, 1986
[51] Int. Cl.[4] ................................................ F02C 7/12
[52] U.S. Cl. ..................................... 60/39.36; 415/115
[58] Field of Search ......................... 60/39.36, 39.43; 415/115, 107, 106; 417/406, 407; 416/97 R

[56] References Cited
U.S. PATENT DOCUMENTS 2,709,893  6/1955  Birmann ............................. 60/39.36
2,873,945  2/1959  Kuhn .
3,009,682  11/1961  Johnson .
3,582,232  6/1971  Okapuu .
4,416,581  11/1983  Geary, Jr. .

Primary Examiner—Louis J. Casaregola
Attorney, Agent, or Firm—Wood, Dalton, Phillips, Mason & Rowe

[57] ABSTRACT

Increased turbine inlet temperatures and/or extended life of turbine rotors in gas turbine engines is achieved by locating a plurality of passages 50 that extend axially in the disc 46 and turbine blades 32 of a so-called monorotor. The passages 50 have inlets 54 between compressor blades 18 on the rotor 20 and exit openings 52 in the free edges 38 of the turbine blades 32. Thus, air compressed by the compressor blades 18 is flowed through the passages 50 to cool the rotor 20.

6 Claims, 1 Drawing Sheet

INTERNAL COOLING 0%
T.I.T. 2860 °R

INTERNAL COOLING 5%
T.I.T. 2860 °R

TURBINE ROTOR COOLING

FIELD OF THE INVENTION

This invention relates to gas turbines, and more particularly, to the cooling of turbine rotors so as to increase rotor life and/or allow operation at higher turbine inlet temperatures.

BACKGROUND OF THE INVENTION

Generally speaking, and with all other things being equal, the efficiency of operation of a gas turbine increases as the turbine inlet temperature, that is, the temperature of the gas applied to the turbine blades, is increased. However, in practice some efficiency to be gained by high temperature operation is given up by using turbine inlet temperatures that are sufficiently low as to enable the turbine rotor to last a reasonable useful life without failure. In short, relatively higher turbine inlet temperatures, while increasing turbine efficiency decrease the useful life of the turbine while relatively lower turbine inlet temperatures provide for a long lived turbine, they result in decreased operating efficiencies.

In order to increase turbine life or allow turbine operation at higher turbine inlet temperatures without sacrificing useful life, various schemes have been proposed for cooling the turbine rotor. A number of the turbine rotor cooling schemes proposed are unwieldy and expensive to implement and thus have not been altogether satisfactory.

The present invention is directed to overcoming this difficulty.

SUMMARY OF THE INVENTION

It is the principal object of the invention to provide a new and improved gas turbine. More specifically, it is an object of the invention to provide a new and improved cooled rotor for use in gas turbines so that higher turbine inlet temperatures may be utilized without sacrificing useful life or, where similar turbine inlet temperatures are used, the turbine is provided with increased useful life.

An exemplary embodiment of the invention achieves the foregoing object in a gas turbine including a combustion gas inlet, an annular diffuser downstream of the inlet, and a combustor for receiving combustion supporting gasses and burning fuel therewith to produce a high pressure turbine driving gas. An annular nozzle is located adjacent the diffuser and receives the turbine driving gas and directs the same generally radially inwardly. A rotor including rotary shaft means extends through and is centered within the annular diffuser and the annular nozzle. The rotor has a disc with compressor blades on one side which are operatively interposed between the inlet and the diffuser, and turbine blades on the other side. A plurality of passages extend at least from the disc one side through the disc and through the turbine blades.

As a consequence of this construction, combustion supporting gas being compressed by the compressor blades flows through the passages in the disc and in the turbine blades. This compressed gas will be considerably cooler than the turbine driving gasses and will thus serve to cool the rotor to either extend its useful life or allow its operation at higher turbine inlet temperatures.

In a preferred embodiment, there are a plurality of such passages in each of the turbine blades and the passages extend generally axially.

In one embodiment of the invention, the passages have inlet ends in the disc one side and located between the compressor blades.

The invention contemplates that the turbine blades have edges opposite the disc and that the passages have outlet ends in such edges.

In a highly preferred embodiment, the disc, the compressor blades and the turbine blades define an integral rotor body, that is, a so-called monorotor.

Other objects and advantages will become apparent from the following specification taken in connection with the accompanying drawings.

DESCRIPTION OF THE PREFERRED EMBODIMENT

Figure 1:
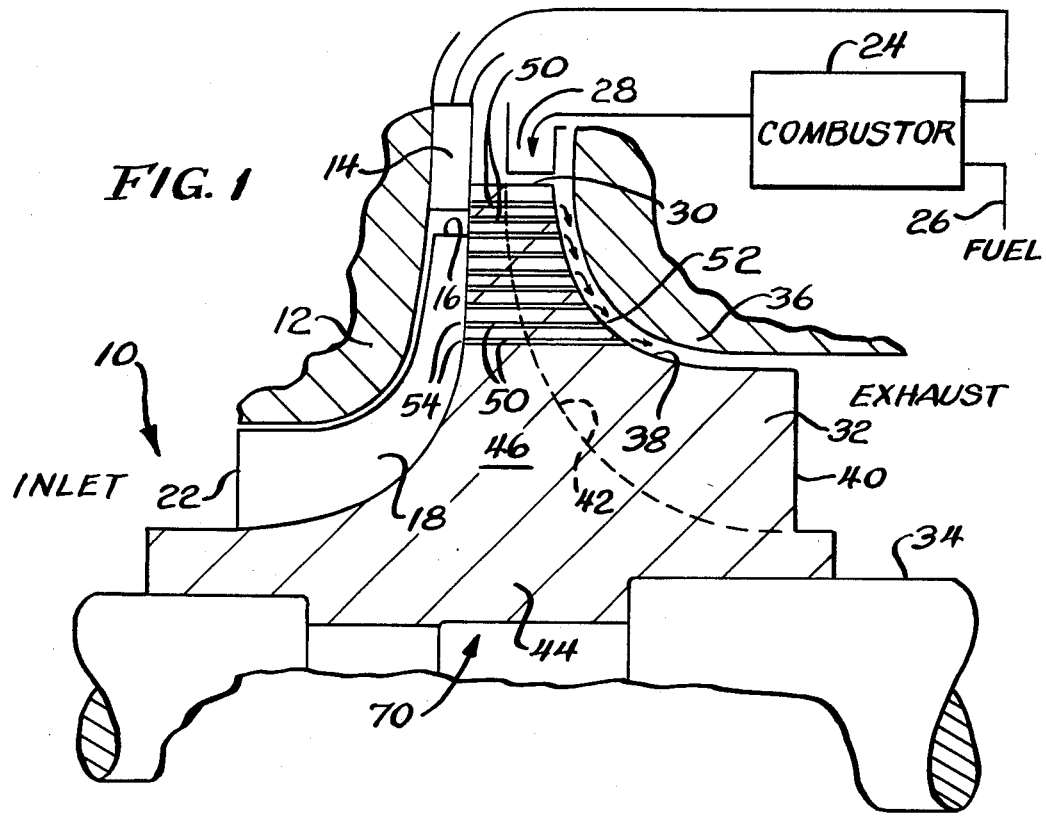
FIG. 1 is fragmentary, somewhat schematic, sectional view of a gas turbine made according to the invention.

An exemplary embodiment of a gas turbine made according to the invention is illustrated in the drawings and with reference to FIG. 1 is seen to be in the form of a radial flow turbine. The same has an air inlet end generally designated 10 at which is located a compressor blade shroud 12. An annular diffuser 14 of conventional construction is supported by the shroud 12 and is operative to perform the usual diffusion operation on compressed gas received from radially outer ends 16 of curved compressor blades 18 carried on a rotor, generally designated 20. The compressor blades 18 also have axial ends 22 adjacent the inlet 10.

Compressed gas to support combustion from the diffuser 14 is directed to an annular combustor shown schematically at 24 which also receives fuel on a line 26. The fuel is combusted within the combustor 24 and then directed to an annular nozzle 28. The hot gasses of combustion exiting the nozzle 28 are directed radially inwardly in a conventional fashion to impinge against radially outer ends 30 of a plurality of turbine blades 32 on the rotor 20.

The rotor 20 may be fitted to a shaft 34 so as to be centered within the diffuser 14 and the nozzle 28. The shaft 34 is journalled by suitable bearings (not shown) so that hot gasses of combustion impinging upon the blades 32 from the nozzle 28 will cause the rotor 20 and thus the shaft 34 to rotate. The rotary motion will be utilized to perform useful work in a known manner and will also drive the compressor blades 18 to compress the air received from the inlet 10 for use in the combustion process. Gas exiting the nozzle 28 is confined against the blades 32 by a conventional turbine blade shroud 36 which is in close adjacency to the free edges 38 of the turbine blades 32. The turbine blades 32, like the compressor blades 18, are curved and terminate in axial ends 40.

The turbine blades 32 have a second edge 42 which, according to the preferred embodiment is really no edge at all. Preferably, the rotor 20 is a so-called monorotor, meaning that the compressor blades 18, the turbine blades 32, the rotor hub 44, and the central disc 46 separating the blades 18 and 32 are all cast as a unitary structure and are integral. As thus far described, the rotor 20 may be regarded as conventional.

Figure 3:
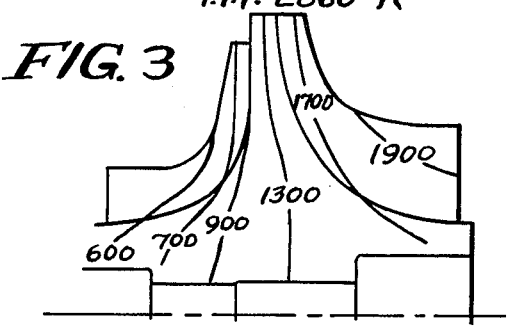
FIG. 3 is a temperature distribution graph showing temperatures at various locations on a turbine rotor not incorporating the present invention.

FIG. 3 illustrates the temperature distribution across various parts of a conventional turbine rotor configured as described above for a turbine inlet temperature of 2,860° Rankine. Thus, FIG. 3 illustrates temperature distribution across an uncooled turbine rotor.

In order to operate at the same turbine inlet temperature, but to reduce the temperature caused stresses on the rotor 20 to extend its life, the cooling means of the invention are utilized to cool the rotor 20.

Figure 2:
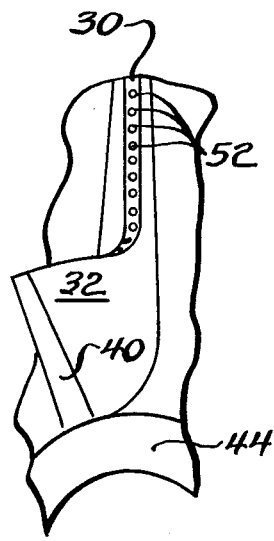
FIG. 2 is a fragmentary end view of a rotor viewing a single turbine blade thereon.

Returning to FIGS. 1 and 2, the cooling means of the invention will be described. They include a plurality of generally axially extending bores or passages 50 which extend through the disc 46 from the side thereof adjacent the compressor blades 18 past the opposite side of the disc 46 and through the turbine blades 32 to emerge from the free edges 38 thereof. Thus, the ends 52 of the bores 50 in the free edges 38 of the blades 32 are exit openings for a coolant gas while the ends 54 of the bores 50 located in the channels between the compressor blades 18 are inlet ends whereby gas from the inlet 10 and compressed by the blades 18 may enter the passages 50 and flow through the same.

Figure 4:
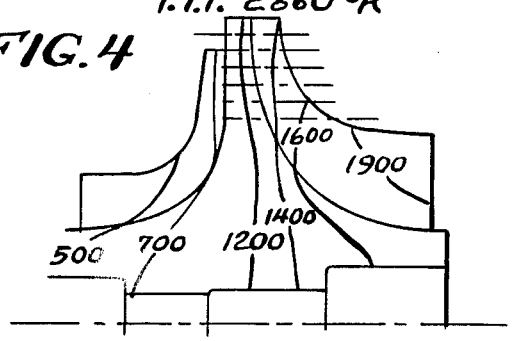
FIG. 4 is a view similar to FIG. 3 but illustrating the temperature distribution across a rotor made according to the invention.

Thus, the invention accomplishes cooling of the turbine blades 32 by bleeding air from the compressor side of the rotor through the passages 50. In a preferred embodiment, perhaps about 5% of the air entering the inlet 10 is caused to flow through the passages 50. Thus, FIG. 4 illustrates the temperature distribution across the rotor for a 5% flow of inlet gas through the passages 50 for cooling purposes. It will be noted that the same turbine inlet temperature, namely, 2,860° Rankine, is employed and that substantial temperature reductions from the uncooled rotor whose temperature distribution is depicted in FIG. 3 are achieved.

The formation of the passages 50 can be accomplished by the simple means of boring the holes parallel to the axis defined by the shaft 34. Thus, the manufacture of the cooled rotor is not complicated and the same enables the use of higher turbine inlet temperatures or, prolongs the life of the rotor. It is expected that turbine inlet temperature could be increased approximately 200° Rankine without sacrificing useful life through utilization of the invention. Alternatively, it is believed that with no increase in turbine inlet temperature, use of the invention will approximately double the life of the rotor.

I claim:

1. A gas turbine comprising:
   a combustion supporting gas inlet,
   an annular diffuser downstream of said inlet;
   a combustor for receiving combustion supporting gas and burning a fuel therewith to produce a high pressure turbine driving gas;
   an annular nozzle adjacent said diffuser and receiving said turbine driving gas and directing the same generally radially inward;
   a rotor including rotary shaft means and extending through and centered in said annular diffuser and said annular nozzle, said rotor having a disc, compressor blades on one side of said disc and operatively interposed between said inlet and said diffuser, and turbine blades on the other side of said disc adjacent said nozzle; and
   a plurality of groups of passages, each group extending at least from said disc one side through said disc and through a corresponding one of said turbine blades.

2. The gas turbine of claim 1 wherein said passages are generally axially extending bores.

3. The gas turbine of claim 1 wherein said passages have inlet ends in said disc one side and between said compressor blades.

4. The gas turbine of claim 1 wherein said turbine blades have edges opposite said disc and said passages have outlet ends in said edges.

5. The gas turbine of claim 1 wherein said disc, said compressor blades and said turbine blades define an integral rotor body.

6. A gas turbine comprising:
   a combustion supporting gas inlet,
   an annular diffuser downstream of said inlet;
   a combustor for receiving combustion supporting gas and burning a fuel therewith to produce a high pressure turbine driving gas;
   an annular nozzle adjacent said diffuser and receiving said turbine driving gas and directing the same generally radially inward;
   a cast rotor including a hub having a central disc separating compressor blades on one side and turbine blades on the other side, said compressor blades curving from axial ends adjacent said inlet to radial ends adjacent said diffuser and having side edges integral with said hub and said disc, said turbine blades also curving from radial ends adjacent said nozzle to axial opposite ends and having first side edges integral with said disc and said hub and second, free side edges opposite therefrom; and
   a plurality of generally axial bores in each of said turbine blades having exit ends in said second free side edges, said bores extending past said first side edges into said disc to terminate in inlet ends in said disc one side so that gas entering said inlet to be compressed by said compressor blades may pass through said bores to thereby cool said rotor.

* * * * *